United States Patent [19]
Takahashi et al.

[11] Patent Number: 4,916,554
[45] Date of Patent: Apr. 10, 1990

[54] INFORMATION SIGNAL REPRODUCING APPARATUS HAVING A TRACKING CONTROL SYSTEM

[75] Inventors: Kouji Takahashi, Kanagawa; Toshiaki Mabuchi, Tokyo, both of Japan

[73] Assignee: Canon Kabushiki Kaisha, Tokyo, Japan

[21] Appl. No.: 235,701

[22] Filed: Aug. 17, 1988

Related U.S. Application Data

[63] Continuation of Ser. No. 833,343, Feb. 25, 1986, abandoned.

[30] Foreign Application Priority Data

Feb. 26, 1985 [JP] Japan ................................ 60-036767
Feb. 26, 1985 [JP] Japan ................................ 60-036768

[51] Int. Cl.$^4$ ........................................... H04N 5/783
[52] U.S. Cl. .................................. 360/10.2; 360/10.3; 360/70; 360/73.05; 360/73.12; 360/77.15
[58] Field of Search .......................... 360/10.1–10.3, 360/70, 73.01, 73.04, 73.05, 73.09, 73.12, 77.01, 77.12–77.14, 75

[56] References Cited

U.S. PATENT DOCUMENTS

| | | | |
|---|---|---|---|
| 4,439,799 | 3/1984 | Haubrich | 360/10.2 |
| 4,563,714 | 1/1986 | Takeuchi | 360/77.14 |
| 4,590,523 | 5/1986 | Honjo | 360/77 |
| 4,636,882 | 1/1987 | Edakubo | 360/10.2 |
| 4,677,503 | 6/1987 | Nagasawa et al. | 360/77.14 X |
| 4,686,589 | 8/1987 | Takimoto | 360/77 |

*Primary Examiner*—Steven L. Stephan
*Assistant Examiner*—W. R. Young
*Attorney, Agent, or Firm*—Robin, Blecker, Daley & Driscoll

[57] ABSTRACT

In an information signal reproducing apparatus of the kind reproducing an information signal from a tape-shaped recording medium on which pilot signals of four different kinds having different frequencies are cyclically recorded in rotation along with the information signal, reference signals of four different kinds which correspond to the pilot signals of four different kinds and are generated one after another in a switch-over cycle to be used for tracking control together with these pilot signals. The reference signals are arranged to be generated one after another in a switch-over cycle which differs from the normal switch-over cycle during a specific period following change-over of the tape-shaped medium moving speed from one speed to another.

27 Claims, 5 Drawing Sheets

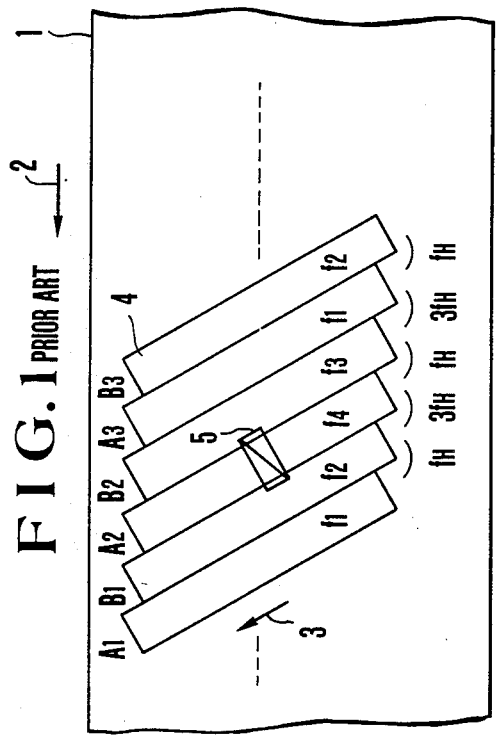
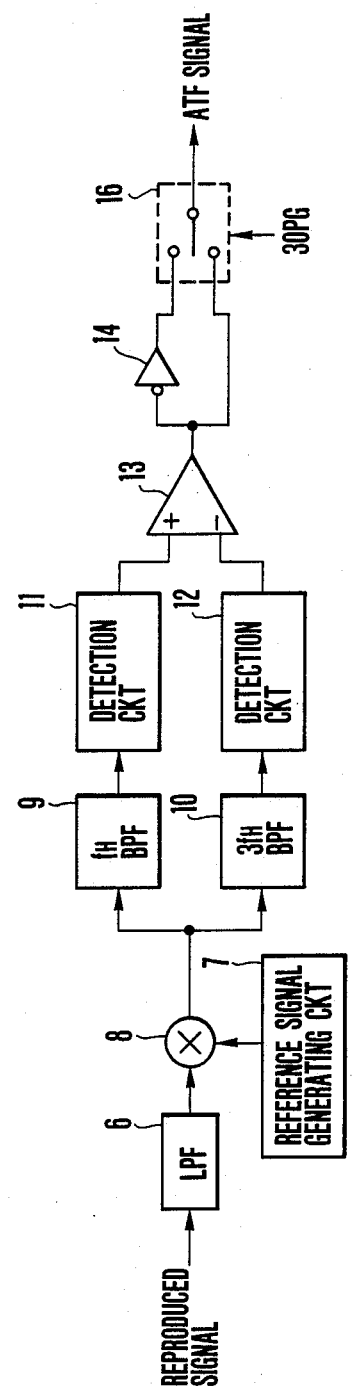
FIG. 1 PRIOR ART
FIG. 2 PRIOR ART

INFORMATION SIGNAL REPRODUCING APPARATUS HAVING A TRACKING CONTROL SYSTEM

This application is a continuation of application Ser. No. 833,343, filed Feb. 25, 1986, now abandoned.

BACKGROUND OF THE INVENTION

1. Field of the Invention:

This invention relates to an information signal reproducing apparatus having a tracking control system and more particularly to an apparatus reproducing an information signal from a tape-shaped recording medium on which pilot signals of four different kinds having different frequencies are cyclically recorded one after another along with the information signal.

2. Description of the Prior Art

The conventional information signal reproducing apparatuses of the above-stated kind include a video tape recorder (hereinafter referred to as VTR) arranged to perform a tracking control operation in a manner called the four-frequency method. In the present specification, this invention is described with the VTR of this kind taken up by way of example.

The tracking control method of the VTR is as follows: FIG. 1 of the accompanying drawing shows a recording pattern formed on a magnetic recording tape by the conventional VTR. The illustration includes the magnetic tape 1; a tape travel direction 2; the tracing direction 3 taken by a magnetic head; recording tracks 4; the magnetic head 5; the frequencies f1, f2, f3 and f4 of pilot signals recorded, one in each of the recording tracks 4; and track numbers An and Bn assigned to these recording tracks. The magnetizing direction of the recording tracks numbered An is arranged to differ from that of the recording tracks numbered Bn. The so-called azimuth overlap writing is accomplished by this arrangement.

When a reproducing head 5 is mainly tracing one of the recording tracks 4 (hereinafter referred to as the main track), the pilot signals are reproduced also from adjacent tracks on both sides of the main track. The levels of the reproduced pilot signals from the two adjacent tracks are equalized with the head arranged to adequately trace the main track.

FIG. 2 shows an example of the conventional circuit arranged on the above-stated concept. Referring to FIG. 2, a low-pass filter (hereinafter referred to as LPF) 6 is arranged to separate a pilot signal component from the reproduced signal. A reference signal generating circuit 7 is arranged to generate a reference signal in the same frequency as that of the pilot signal recorded in the main track. The circuit arrangement includes a multiplier 8; band-pass filters (BPF's) 9 and 10; detection circuits 11 and 12; a comparator 13; and an inversion circuit 14.

Assuming that a frequency difference between the pilot signals recorded in two adjacent tracks is fH (which corresponds to a horizontal scanning frequency) or 3fH as shown in FIG. 1, the BPF 9 is arranged to separate an fH component and the other BPF 10 to separate a 3fH component. In other words, each of the reproduced pilot signals from the two adjacent tracks is obtained in the form of a difference from the reference signal by which they are multiplied at the multiplier 8. The comparator 13 compares these reproduced pilot signals. Since the directions in which the fH and 3fH components are obtained for one track become converse for a next track, the output of the comparator is produced from a switch 16 either via an inverting amplifier 14 or without passing the amplifier 14 alternately for every recording track. The output of the switch 16 becomes a tracking error signal. Further, assuming that a one-field (1/60 sec. in the case of an NTSC signal) portion of a video signal is recorded in one track, the operation of the switch is controlled by a rectangular wave signal of 30 Hz (hereinafter referred to as the 30 PG signal) which is synchronized with the rotation of the head 5. The reference signal does not have to be the same as the pilot signal recorded in the main track. For example, the inverting amplifier 14 and the switch 16 may be omitted by arranging the frequency sequence of the reference signals as f1, f3, f4 and f2 while that of the pilot signals of the main tracks is f1, f2, f3 and f4.

In obtaining the tracking error signal by the VTR of the above-stated kind, the kind of the pilot signal recorded in the main track is not always distinguishable. Even if the VTR is of a type arranged to have the frequency of the reference signal coincide with that of the pilot signal of the main track, the reference signal is not always in agreement with the pilot signal under a transient condition. Therefore, it is only possible to generate the reference signals in a predetermined rotation. Then, in the event of a prolonged transient condition, a reproduced video signal would deteriorate during the transient period of the tracking control.

SUMMARY OF THE INVENTION

It is an object of this invention to shorten the period of the transient condition of the above-stated tracking control.

It is another object of this invention to provide an information signal reproducing apparatus which is capable of promptly detecting the kind of the pilot signal recorded in the main track being mainly traced by a reproducing head.

To attain this object, an information signal reproducing apparatus arranged according to this invention to reproduce an information signal from a tape-shaped recording medium on which pilot signals of four different kinds having different frequencies are cyclically recorded in rotation along with the information signal comprises: moving means for moving the tape-shaped recording medium in the longitudinal direction of the tape; a reproducing head arranged to reproduce the information signal; separating means for separating the pilot signals from a signal reproduced by the reproducing head; reference signal generating means for generating one by one in a switch-over cycle reference signals of four different kinds corresponding to the four kinds of the pilot signals; tracking control means for controlling the position of the head relative to that of the medium by using the pilot signals separated by the separating means and the reference signals generated by the reference signal generating means; instruction means for instructing the moving means to shift the medium moving speed thereof from one speed to another; and reference signal control means arranged to have the reference signal switch-over cycle of the reference signal generating means changed to a different cycle for a specific period determined in response to the instruction of the instruction means.

It is a further object of this invention to prevent tracking control from coming into disorder at the time of change-over from one recording medium moving speed to another.

To attain that object, an information signal reproducing apparatus arranged according to this invention to reproduce an information signal from a tape-shaped recording medium on which pilot signals of four different kinds having different frequencies are cyclically recorded in rotation along with the information signal comprises: moving means for moving the tape-shaped recording medium in the longitudinal direction of the tape; a reproducing head arranged to reproduce the information signal; separating means for separating the pilot signals from a signal reproduced by the reproducing head; reference signal generating means for generating one by one, in a switch-over cycle, reference signals of four different kinds corresponding to the four kinds of the pilot signals; tracking control means for controlling the position of the head relative to that of the medium by using the pilot signals separated by the separating means and the reference signals generated by the reference signal generating means; instruction means for instructing the moving means to shift the medium moving speed thereof from one speed to another; detecting means for detecting, during a specific period determined in response to the instruction of the instruction means, the kind of the pilot signal mainly reproduced by the reproducing head; and determining means for determining, according to the result of detection made by the detecting means, the kind of the reference signal to be generated by the reference signal generating means immediately after the specific period.

These and further objects and features of this invention will become apparent from the following detailed description of preferred embodiments thereof taken in connection with the accompanying drawings.

BRIEF DESCRIPTION OF THE DRAWINGS

FIG. 1 is an illustration of a recording pattern formed on a magnetic recording tape by the conventional VTR.

FIG. 2 is a circuit diagram showing by way of example a tracking error detection circuit employed in the conventional VTR.

DETAILED DESCRIPTION OF THE PREFERRED EMBODIMENTS

Figure 3:
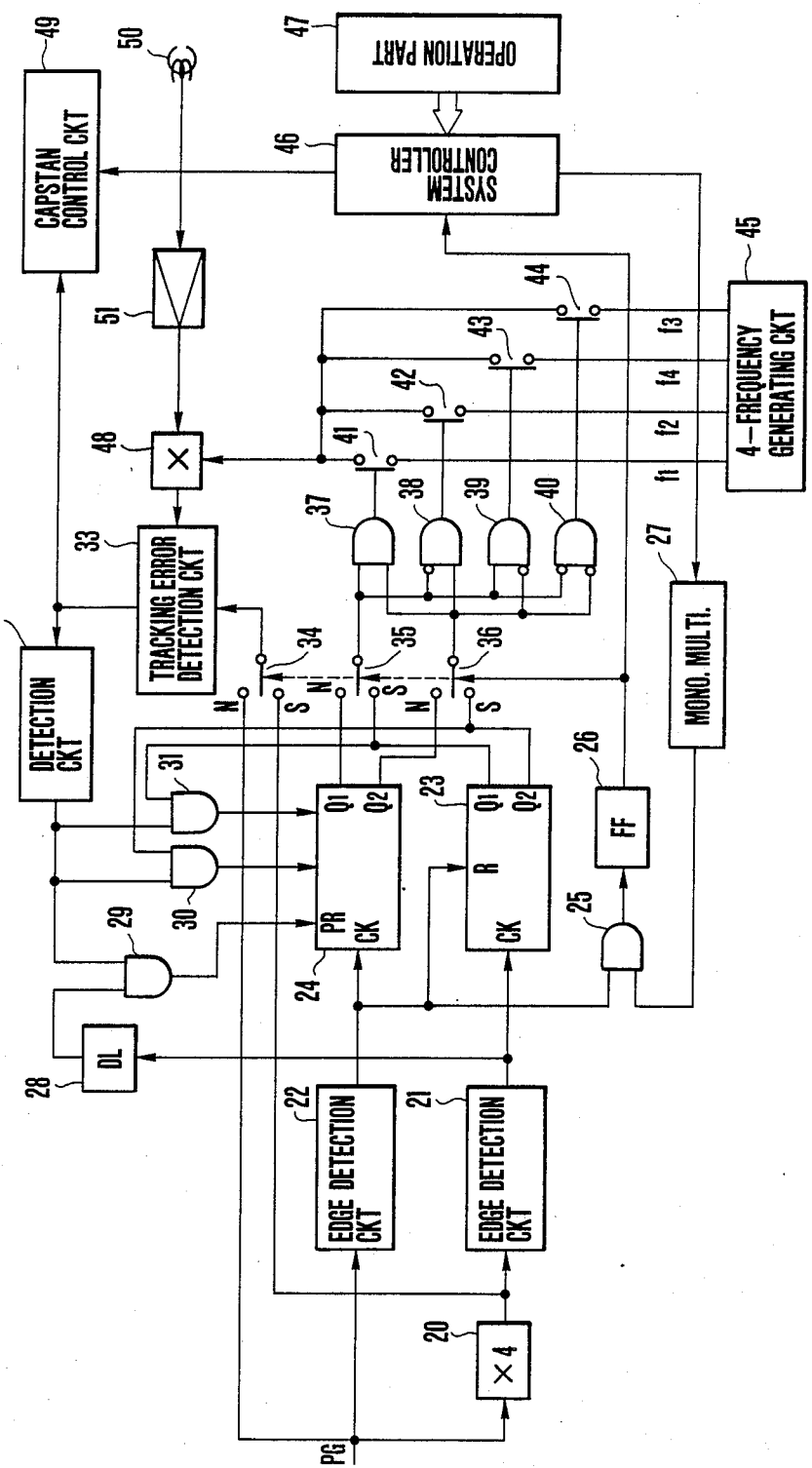
FIG. 3 is a circuit diagram showing the essential parts of a VTR arranged according to this invention as an embodiment thereof.

Embodiments wherein this invention is applied to VTR's of the above-stated kind are arranged as described below with reference to the accompanying drawings:

FIG. 3 shows in outline the arrangement a VTR embodying this invention as an embodiment thereof. In FIG. 3, two rotary heads are schematically represented by a reproduction head 50. A reproduction amplifier 51 is arranged to include an LPF. The reproduction amplifier 51 supplies reproduced pilot signals to a multiplier 48. Meanwhile, the 30 PG signal mentioned in the foregoing is supplied to an edge detection circuit 22 and a 4-step-up circuit 20. The 4-step-up circuit 20 is arranged to step up the 30 PG signal four times by means of a PLL or the like and to produce a rectangular wave signal of 120 Hz (hereinafter referred to as 120 PG signal). The 120 PG signal and the 30 PG signal are respectively supplied to edge detection circuits 21 and 22 to obtain pulses of 240 Hz and 60 Hz from these circuits 21 and 22. These pulses are respectively counted by 2-bit counters 23 and 24. The counters 23 and 24 then respectively produces counted values from their terminals Q1 and Q2.

During normal reproduction, the connecting positions of all switches 34, 35 and 36 are on the side of their terminals N. Under this condition, logic gates 37, 38, 39 and 40 are controlled by the output of the counter 24. As a result, at every one-field period, high level signals are produced from these logic gates in the sequence of the gate 37, the gate 38, the gate 39 and the gate 40. These high level signals turns on switches 41, 42, 43 and 44 one after another. Meanwhile, these switches 41, 42, 43 and 44 are respectively receiving from a 4-frequency generating circuit 45 reference signals of frequencies f1, f2, f3 and f4. With the switches arranged in that manner, the reference signals are supplied one by one to a multiplier 48 in rotation in the sequence of frequencies f1- f2- f4- f3.

The output of the multiplier 48 is supplied to a tracking error detection circuit 33 which is similar to the one shown in FIG. 2. A capstan control circuit 49 is under the control of a tracking error signal produced from the tracking error detection circuit 33. Meanwhile, the 30 PG signal which is supplied via the terminal N of the switch 34 is arranged to control a circuit similar to the switch 16 of FIG. 2.

Assuming that this VTR is reproducing a still picture, if the operator instructs the VTR to change the still picture reproduction over to normal reproduction, the VTR operates as follows: With the change-over instruction produced for change-over from the still picture reproduction to the normal reproduction through an operation part 47, a system controller 46 first applies a pulse to a monostable multivibrator (hereinafter referred to as MM) 27. Upon receipt of this pulse, the MM 27 produces a high level signal over a period corresponding to about a two-field period. During this period, two pulses are produced from the edge detection circuit 22. The two pulses are supplied via an AND gate 25 to a flip-flop (hereinafter referred to as FFO 26. The FF 26 then produces a high level signal for a one-field period in synchronism with the 30 PG signal. The output of the FF 26 is supplied to the switches 34, 35 and 36 to shift their connecting positions to the side of their terminals S. Meanwhile, as will be described later, the kind of the pilot signal recorded in the recording track mainly traced by the head during the still reproduction is detected and a reference signal which is suited for normal reproduction to be performed thereafter is supplied to the multiplier 48. After the fall of the level of the output of the FF 26, the system controller 46 controls the speed control system of the capstan control circuit 49 to cause the tape which is not shown to be allowed to travel at the same travelling speed as the speed employed for recording.

With the connecting positions of the switches 34, 35 and 36 shifted to the terminals S, the output of the counter 23 causes the reference signals to be supplied to the multiplier 48 in the order of frequencies f1- f2, f4 and f3 within one field period.

Figure 4:
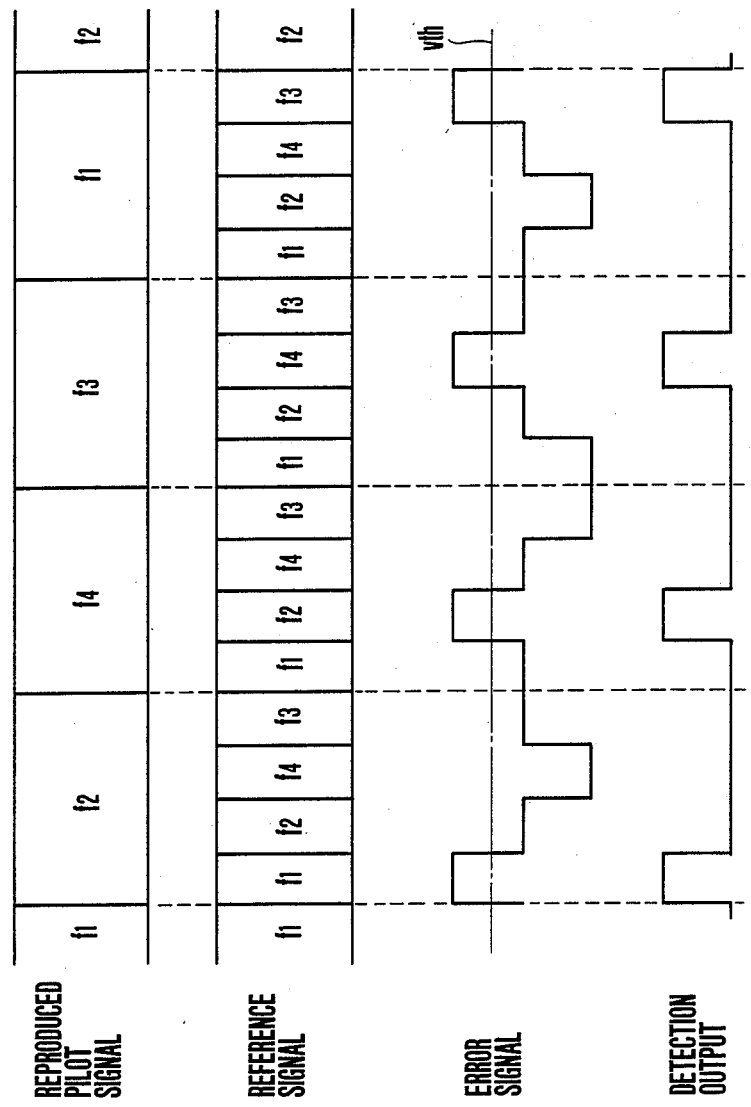
FIG. 4 is an illustration of arrangement for detecting the kind of the pilot signal by the VTR of FIG. 3.

FIG. 4 shows the details of the tracking error signal which is obtained with reference signals of four kinds generated in one field period during a still picture reproducing operation. The error signal becomes as shown in FIG. 4 under varied conditions. Generally, the level of the error signal becomes high when the reference signal is generate in the same frequency as the pilot signal recorded in a recording track immediately preceding the main track and becomes low when the reference signal is generated in the same frequency as that of the pilot signal recorded in a track immediately following the main track presently traced. Therefore, use of these outputs permits detection of the kind of the pilot signal superimposed in the main track which is presently mainly traced by the reproducing head.

The error signal which thus obtained from the tracking error detection circuit 33 is supplied to the detection circuit 32. At the circuit 32, a period during which the level of the error signal is higher than a threshold level Vth is detected as shown in FIG. 4. During this period, the reference signal supplied to the multiplier 48 is of a frequency which is the same as the frequency of the pilot signal recorded in the track immediately preceding the main track which is mainly reproduced during still picture reproduction. In this instance, the output data of the counter 23 is used for causing this reference signal to be generated. The data produced from the counter 23 is gated via the output of the detection circuit 32 obtained via AND gates 30 and 31. The gated data is supplied to the counter 24 as preset data. The counter 24 is arranged to be preset by a pulse which is obtained by delaying the pulse of the above-stated 240 Hz to an extent of about 1/480 sec. by a delay circuit 28.

After the counter 24 is thus preset, when a pulse which is first produced from the edge detection circuit 22 is supplied to the counter 24, the output level of the FF 26 changes to a low level. Then, the connecting positions of the switches 34, 35 and 36 are shifted to their terminals N. The capstan control circuit 49 is then controlled by the output of the system controller 46. The tape then begins to travel at a speed which is the same as the speed employed for recording. At the same time, the counted value of the counter 24 is renewed. Therefore, one of the reference signals having the same frequency as that of the pilot signal recorded in the track being mainly traced by the head 50 during the still picture reproducing operation is supplied to the multiplier 48. After that, reproduction is performed with reference signals generated in exactly the same rotation as in normal reproduction.

With the embodiment arranged as described above, the transient condition which takes place in the event of change-over from still picture reproduction to normal reproduction can be promptly brought back to a normal condition, so that a good reproduced picture without any disturbance can be obtained.

The arrangement of the VTR described above gives the advantageous effect not only on the transient condition that takes place at the time of change-over from still picture reproduction to normal reproduction but also on other transient conditions such as a joing part of a record, etc. For such a purpose, the embodiment may be simply arranged to trigger the MM 27 of FIG. 3 upon detection of such a joint part. Further, the same advantageous effect is of course likewise attainable in the event of change-over to other reproduicng mode such as slow motion reproduction, etc.

The embodiment may be modified as follows: The series of four different reference signals are arranged to be generated twice or in two rounds during each one-field period. The kind of pilot signal recorded in each track mainly traced by the reproducing head is detected by the reference signals of four kinds in the first round of generation. Then, one of the reference signals of four kinds which is thus designated by the first round is used when it is generated in the second round for obtaining a tracking error signal. In this instance, it goes without saying that the error signal must be sampled and held for a one-field period at a timing determined on the basis of the result of detection.

Figure 5:
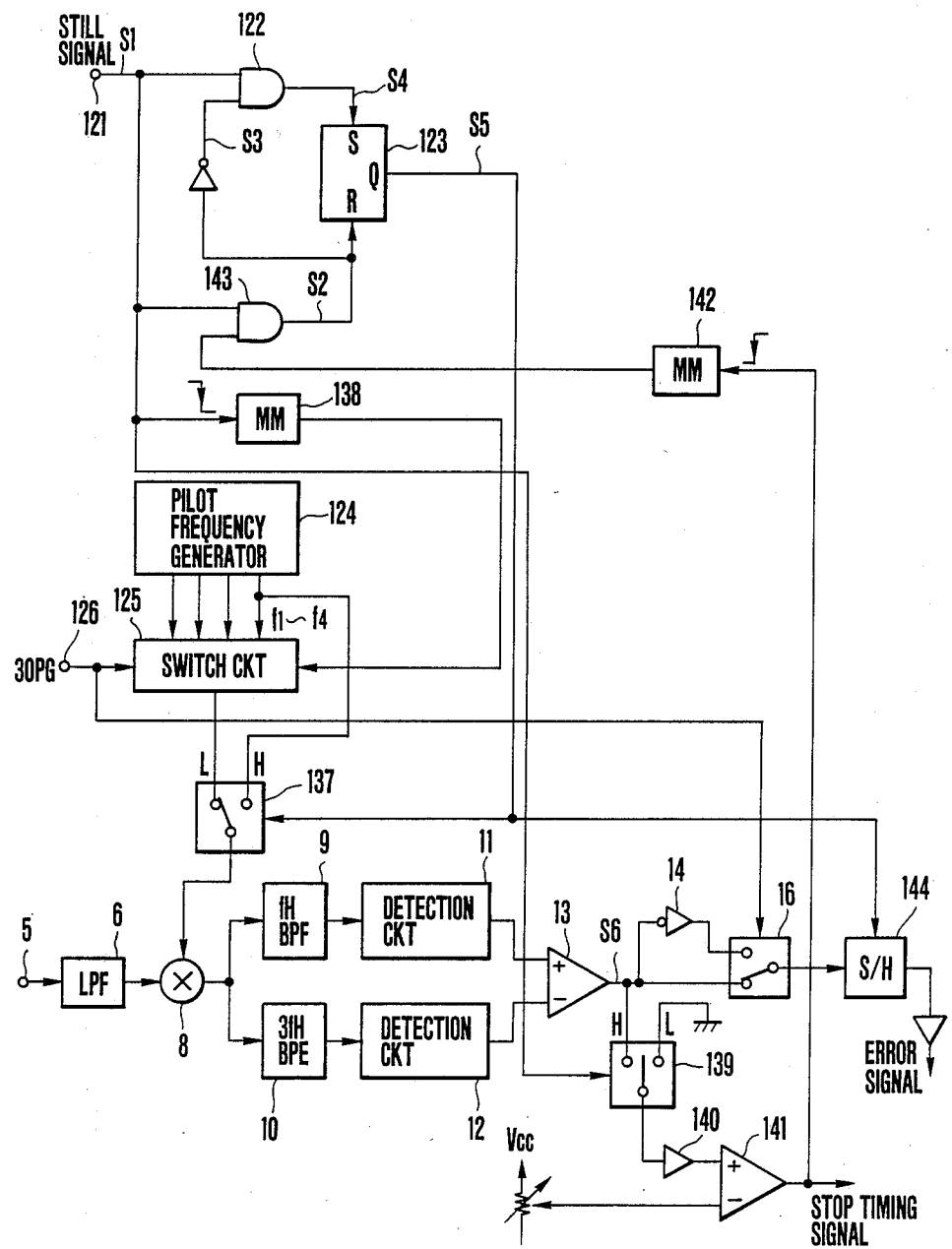
FIG. 5 is a circuit diagram showing the essential parts of a VTR arranged as another embodiment of this invention.

FIG. 5 shows in outline the arrangement of a VTR which is arranged as another embodiment of this invention. In FIG. 5, the same component elements as those shown in FIG. 2 are indicated by the same reference numerals. The embodiment includes a terminal 121 which is arranged to receive a still mode instruction signal from an operation part (not shown). When an instruction is given for a still picture mode, the terminal 121 receives a signal S1 at a high level. The signal S1 is supplied to an AND gate 122. A logical product is obtained at the AND gate 122 from the signal S1 and a signal S3 which is obtained by inverting a reset signal S2 which will be described later. A flip-flop (FF) 123 is set by the rise of the output of the AND gate 122. As a result, the FF 123 produces a signal S5 from its Q output terminal. This signal S5 shifts the connecting position of a switch 137 from its terminal L to another terminal H. A pilot frequency generating circuit 124 is arranged to generate four different frequencies f1, f2, f4 and f3. Signals having these frequencies are selectively produced one by one via a switch circuit 125. The details of this switch circuit 125 is as shown by way of example in FIG. 6. The 30 PG signal which comes to a terminal 126 of FIG. 5 is changed into narrow pulses of 60 Hz by an edge detection circuit 127 and is supplied to the clock terminal of a counter 128. The counted values Q1 and Q2 of the counter 128 are supplied to logic gates 129, 130, 131 and 132. The output levels of these gates then become high one after another, each remaining at a high level for a one-field period in the sequence of gates 129, 130, 131 and 132. This turns on switches 133, 134, 135 and 136 one by one. As a result, reference signals of frequencies f1, f2, f4 and f3 are supplied in that sequence to the terminal L of a switch 137. During normal reproduction, the output of this switch 137 is supplied to the multiplier 8. Then, a tracking error signal is generated from the switch 16 in the manner as described in the foregoing.

Meanwhile, again referring to FIG. 5, to the other terminal H of the switch 137 is constantly supplied a signal having a frequency f4. This signal comes to be supplied to the multiplier 8 when the output level of the FF 123 becomes high.

Figure 7:
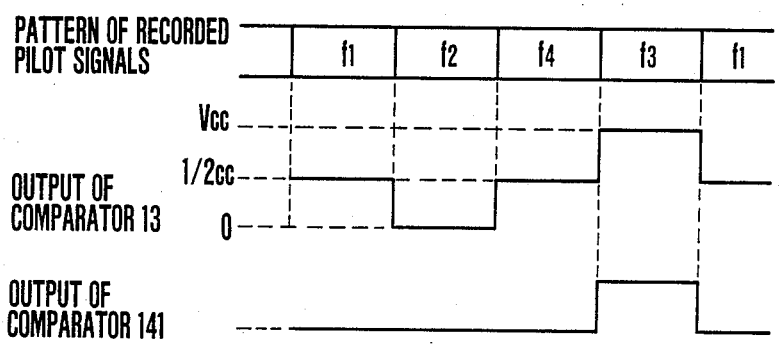
FIG. 7 is an illustration of the arrangement of the VTR of FIG. 5 for detecting the kind of the pilot signal.

Assuming that the reproducing head which is not shown is mainly tracing each of recording tracks in which the pilot signals of frequencies f1, f2, f4 and f3 are recorded, frequency components of 3fH, 4fH, 0 and fH which are obtained respectively from these tracks are produced in greater amounts than other frequency components from the multiplier 8. Since BPF's 9 and 10 are arranged to allow the frequency components fH and 3fH to pass, the output of the comparator 13 becomes as shown in FIG. 7. A switch 139 is arranged to supply the output of the comparator 13 via an amplifier 140 to the positive input terminal of a comparator 141. At that time, to the negative input terminal of the comparator 141 is supplied a voltage which is about ⅔ of a power supply voltage Vcc. As a result, the output level of the comparator 141 becomes high only when the pilot signal having the frequency f3 is recorded in the main track.

With the output of the comparator 141 assumed to be used as an instruction signal for bringing the driving operation of the capstan motor to a stop, the tape is stopped from travelling at a point of time when the frequency o the pilot signal reproduced from the main track changes from f4 to f3. Then, an MM 142 which is triggered by the output of the comparator 141 turns an AND gate 143 on. With the AND gate 143 turned on, the above-stated reset signal S2 is obtained to reset an FF 123. With the FF 123 reset, the connecting position of a change-over switch 137 is shifted to its terminal L. This allows the reference signals of frequencies f1, f2, f4 and f3 to be supplied to the multiplier 8 in the normal manner. In the meantime, a switch circuit 125 is producing the reference signals in the sequence of frequencies f1, f2, f4 and f3. Therefore, control over the stopping position of the tape can be accurately carried out by using these reference signals.

Further, during this period during which the Q output of the FF 123 is at a high level, a sample-and-hold circuit (S/H) 144 operates to keep the tracking error signal at a given constant value in such a way as to prevent any unnecessary tracking error signal from being supplied to a capstan control circuit which is not shown.

Figure 6:
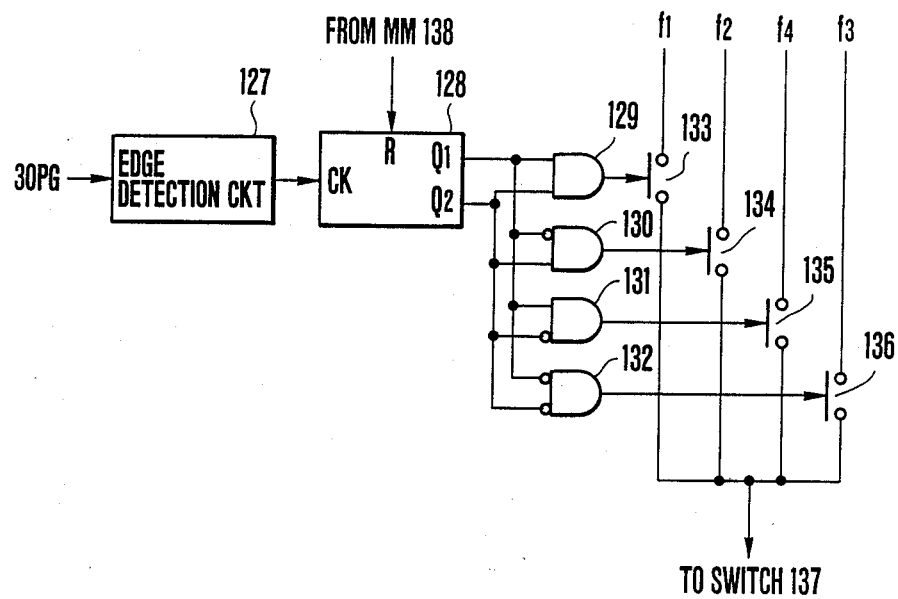
FIG. 6 is a circuit diagram showing by way of example the details of arrangement of a switch circuit which is included in the VTR of FIG. 5.

While the VTR is arranged to begin a still picture reproducing operation in the manner as described above, in performing normal reproduction with the still mode instruction cancelled, the VTR operates as follows: With the level of the still mode instruction signal S1 changing to a low level, an MM 138 is triggered to supply the switch circuit 125 with a reset pulse. The counter 128 which is shown in FIG. 6 is reset by this reset pulse. Following this, the reference signal of the frequency f1 is produced from the switch circuit 125. The reference signal of frequency f1 is again followed one by one by other reference signals of frequencies f2, f4 and f3. The arrangement is such that, even immediately after the change-over to normal reproduction, the reference signals come to coincide with the reproduced pilot signals to permit the tracking control to be promptly carried out.

In the embodiment described above, a frequency f4 is employed as a given frequency signal. However, with the influence of inertia, etc. taken into consideration, this frequency f4 may be replaced with some other suitable frequency. For example, in the event of a little larger inertia, the frequency f4 may be replaced with a frequency f3.

The advantageous effect of this invention is attainable not only for the change-over between normal reproduction and still picture reproduction but also for change-over between high speed search reproduction and normal reproduction or between slow motion reproduction and normal reproduction.

While VTR's are solely taken up in the foregoing description of embodiments, the range of possible applications of this invention is not limited to VTR's and this invention is applicable also to apparatuses of other kinds such as a digital audio tape recorder, etc.

What is claimed is:

1. An information signal reproducing apparatus for reproducing an information signal from a tape-shaped recording medium on which pilot signals of four different kinds having different frequencies are cyclically recorded in rotation along with said information signal, comprising:
   (a) moving means for moving said tape-shaped recording medium in the longitudinal direction of said tape;
   (b) a reproducing head arranged to reproduce said information signal;
   (c) separating means for separating said pilot signals from a signal reproduced by said reproducing head;
   (d) reference signal generating means for generating one by one, in a switch-over cycle, reference signals of four different kinds corresponding to the four kinds of said pilot signals;
   (e) tracking control means for controlling the position of said head relative to that of said medium by using said pilot signals separated by said separating means and said reference signals generated by said reference signal generating means;
   (f) instruction means for instructing said moving means to shift said medium moving speed thereof from one speed to another;
   (g) reference signal control means arranged to have said reference signal switch-over cycle of said reference signal generating means changed to a different cycle during a specific period determined in response to the instruction of said instruction means, said specific period having a predetermined period time; and
   (h) moving control means for controlling said moving means to shift said medium moving speed thereof from one speed to another after said specific period.

2. An apparatus according to claim 1, further comprising means for detecting the kind of the pilot signal being mainly reproduced by said reproducing head during said specific period, to generate two binary detection signals.

3. An apparatus according to claim 2, wherein said tracking control means includes means for forming a tracking error signal indicative of the positional deviation of the tracing locus of said reproducing head from each of tracks in which said information signal is recorded on said recording medium.

4. An apparatus according to claim 3, wherein said detecting means detects the kind of said pilot signal on the basis of the level of said tracking error signal.

5. An apparatus according to claim 4, wherein said detecting means includes a level comparison circuit which compares the level of said tracking error signal with a given threshold level.

6. An apparatus according to claim 2, further comprising determining means for determining, on the basis of said two binary detection signals generated by said detecting means, the kind of the reference signal to be generated by said reference signal generating means immediately after said specific period.

7. An apparatus according to claim 1, wherein said reference signal control means is arranged to cause said reference signal generating means to generate always one and the same kind of the reference signal during said specific period.

8. An apparatus according to claim 7, wherein said information signal includes a video signal; and, during said specific period, the length of said video signal is at least a portion thereof corresponding to a four-field period.

9. An apparatus according to claim 1, wherein said reference signal control means is arranged to cause the reference signal switch-over cycle of said reference signal generating means to become ¼ thereof during said specific period.

10. An apparatus according to claim 9, wherein said information signal includes a video signal; and, during said specific period, the length of said video signal is at least a portion thereof corresponding to a one-field period.

11. A video signal reproducing apparatus for reproducing a video signal from a tape-shaped recording medium on which pilot signals of four different kinds having different frequencies are cyclically record along with said video signal so that each of said pilot signals is recorded with one field period of said video signal, comprising:
(a) a reproducing head for reproducing said information signal;
(b) separating means for separating said pilot signals from a signal reproduced by said reproducing head;
(c) reference signal generating means for cyclically generating reference signals of four different kinds corresponding to the four kinds of said pilots signals;
(d) tracking control means for controlling the position of said head relative to that of said medium by using said pilot signals separated by said separating means and said reference signals generated by said reference signal generating means; and
(e) reference control means for controlling said generating means to have said reference signals of at least three kinds generated within said one field period of said vide signal.

12. An apparatus according to claim 11, wherein said generating means is arranged to generate a reference signal of one of four different kinds of said reference signals for each of said one field period of said video signal other than a specific period controlled by said reference control means.

13. An apparatus according to claim 12, further comprising means for detecting the kind of the pilot signal mainly reproduced by said reproducing head during said specific period.

14. An apparatus according to claim 13, further comprising determining means for determining, according to the result of detection by said detecting means, the kind of the reference signal to be generated by said generating means immediately after said specific period.

15. An apparatus according to claim 14, further comprising moving means for moving said recording medium.

16. An apparatus according to claim 15, wherein said specific period corresponds to a timing at which the medium moving speed of said moving means is changed from a speed which differs from a speed employed for recording over to a speed which is the same as the recording speed.

17. An apparatus according to claim 16, wherein said speed which differs from said recording speed is zero.

18. An information signal reproducing apparatus for reproducing an information signal from a tape-shaped recording medium on which pilot signals of four different kinds having different frequencies are recorded one by one, one for every given period of time, along with said information signal, comprising:
(a) moving means for moving said tape-shaped n recording medium in the longitudinal direction of said tape;
(b) a reproducing head for reproducing said information signal;
(c) separating means for separating said pilot signals from a signal reproduced by said reproducing head;
(d) reference signal generating means for generating one by one in a switch-over cycle reference signals of four different kinds corresponding to the four kinds of said pilot signals;
(e) tracking control means for controlling the position of said head relative to that of said medium by using said pilot signals separated by said separating means and said reference signals generated by said generating means;
(f) instruction means for instructing said moving means to shift said medium moving speed thereof from one speed to another; and
(g) reference control means for controlling said generating means to have one and the same kind of the reference signal always generated during a specific period determined in response to the instruction of said instruction means and to have said different kinds of reference signals generated, one for each of said given periods of time other than said specific period, said specific period having a predetermined period of time which is at least three times as long as said given period of time.

19. An apparatus according to claim 18, further comprising detecting means for detecting the kind of the pilot signal mainly reproduced by said reproducing head during said specific period.

20. An apparatus according to claim 19, further comprising movement means for moving said recording medium.

21. An apparatus according to claim 20, further comprising moving operation control means for controlling the medium moving operation o said moving means on the basis of the result of detection made by said detecting means.

22. An apparatus according to claim 21, wherein said moving operation control means is arranged to control a timing at which the medium moving operation of said moving means comes to a stop.

23. An information signal reproducing apparatus for reproducing an information signal from a tape-shaped recording medium on which pilot signals of four different kinds having different frequencies are cyclically recorded in rotation along with said information signal, comprising:
(a) moving means for moving said tape-shaped recording medium in the longitudinal direction of said medium;
(b) a reproducing head arranged to reproduce said information signal;
(c) separating means for separating said pilot signals from a signal reproduced by said reproducing head;
(d) reference signal generating means for generating one by one, in a switch-over cycle, reference signals of four different kinds corresponding to the four kinds of said pilot signals;

(e) tracking control means for controlling the position of the head relative to that of said medium by using said pilot signals separated by said separating means and said reference signals generated by said reference signal generating means;

(f) instruction means for instructing said moving means to change the medium moving speed thereof from one speed to another;

(g) detecting means for detecting, during a specific period determined in response to the instruction of said instruction means, the kind of the pilot signal being mainly reproduced by said reproducing head to generate two binary detection signals indicating one of said pilot signals; and (h) determining means for determining the kind of the reference signal to be generated by said generating means immediately after said specific period on the basis of said two binary detection signals.

24. An apparatus according to claim 23, wherein said instruction means is arranged to give an instruction for change-over of the medium moving speed of said moving means from a speed which differs from a speed employed for recording to a speed which is the same as the recording speed.

25. An information signal reproducing apparatus for reproducing an information signal from a tape-shaped recording medium on which pilot signals of four different kinds having different frequencies are cyclically recorded in rotation along with said information signal, comprising:

(a) moving means for moving said tape-shaped recording medium in the longitudinal direction of said medium;

(b) a reproducing head arranged to reproduce said information signal;

(c) separating means for separating said pilot signals from a signal reproduced by said reproducing head;

(d) reference signal generating means for generating one by one, in a switch-over cycle, reference signals of four different kinds corresponding to the four kinds of said pilot signals;

(e) tracking control means for controlling the position of said head relative to that of said medium by using said pilot signals separated by said separating means and said reference signals generated by said generating means;

(f) instruction means for instructing said moving means to change the medium moving speed thereof from one speed to another;

(g) detecting means for detecting, during a specific period determined in response to the instruction given by said instruction means, the kind of the pilot signal being mainly reproduced by said reproducing head; and (h) timing control means for controlling a timing for said change-over of the medium moving speed of said moving means on the basis of the result of detection made by said detecting means.

26. An apparatus according to claim 25, wherein the medium moving speed of said moving means is zero after said change-over.

27. An information signal reproducing apparatus for reproducing an information signal from a tape-shaped recording medium on which pilot signals of four different kinds having different frequencies are cyclically recorded in rotation along with said information signal, comprising:

(a) moving means for moving said tape-shaped recording medium in the longitudinal direction of said medium;

(b) a reproducing head arranged to reproduce said information signal;

(c) separating means for separating said pilot signals from a signal reproduced by said reproducing head;

(d) reference signal generating means for generating one by one in a switch-over cycle reference signals of four different kinds corresponding to the four kinds of said pilot signals;

(e) tracking error signal forming means for forming a tracking error signal indicative of the position of said head relative to that of said medium by using said pilot signals separated by said separating means and said reference signals generated by said generating means;

(f) instruction means for instructing said moving means to change the medium moving speed thereof from one speed to another; and (g) detecting means which, during a specific period determined in response to the instruction given by said instruction means, detects by using said tracking error signal the kind of the pilot signal being mainly reproduced by said reproducing head to generate two binary detection signals indicating one of said pilot signals.

* * * * *